United States Patent
Matsuno et al.

(10) Patent No.: US 7,761,208 B2
(45) Date of Patent: Jul. 20, 2010

(54) VEHICLE BEHAVIOR CONTROL DEVICE

(75) Inventors: Koji Matsuno, Tokyo (JP); Keisuke Hosokawa, Tokyo (JP); Koichi Inoue, Tokyo (JP); Shigeo Usui, Tokyo (JP); Yuji Kubota, Tokyo (JP); Eiji Shibata, Tokyo (JP); Hiroyuki Sekiguchi, Tokyo (JP); Masaru Kogure, Tokyo (JP)

(73) Assignee: Fuji Jukohyo Kabushiki Kaisha, Tokyo (JP)

( * ) Notice: Subject to any disclaimer, the term of this patent is extended or adjusted under 35 U.S.C. 154(b) by 871 days.

(21) Appl. No.: 11/593,629

(22) Filed: Nov. 7, 2006

(65) Prior Publication Data
US 2007/0112499 A1    May 17, 2007

(30) Foreign Application Priority Data
Nov. 8, 2005    (JP)    ............... 2005-323991

(51) Int. Cl.
  *B60T 8/1755*    (2006.01)
  *G06F 19/00*    (2006.01)
(52) U.S. Cl. ............................. 701/48; 701/69; 303/146
(58) Field of Classification Search ........................ None
  See application file for complete search history.

(56) References Cited

U.S. PATENT DOCUMENTS

| | | | |
|---|---|---|---|
| 2002/0052681 A1 | 5/2002 | Matsuno | |
| 2002/0055416 A1 | 5/2002 | Sakakiyama | |
| 2003/0102713 A1* | 6/2003 | Murakami | 303/146 |
| 2004/0176898 A1 | 9/2004 | Belvo et al. | |
| 2005/0027402 A1 | 2/2005 | Koibuchi et al. | |
| 2005/0125131 A1* | 6/2005 | Kato et al. | 701/70 |
| 2005/0216161 A1* | 9/2005 | Sakugawa | 701/70 |

FOREIGN PATENT DOCUMENTS

| EP | 1 197 410 A2 | 4/2002 |
|---|---|---|
| EP | 1 203 688 A2 | 5/2002 |
| JP | 2003-191774 | 7/2003 |

OTHER PUBLICATIONS

European Search Report corresponding to European Patent Application No. 06123646.9 dated Dec. 21, 2007.

* cited by examiner

*Primary Examiner*—Michael J. Zanelli
(74) *Attorney, Agent, or Firm*—Smith, Gambrell & Russell, LLP

(57) ABSTRACT

An adjustment unit identifies a front-rear driving force distribution control unit and a braking force control unit, and calculates based on the current vehicle state, a target yaw moment required for each of the front-rear driving force distribution control unit and braking force control unit. Then, based on the current operating state of each of the control units, a control correction value for each unit is calculated in consideration of the maximum value, and outputted.

12 Claims, 8 Drawing Sheets

VEHICLE BEHAVIOR CONTROL DEVICE

This application claims benefit of Japanese Application No. 2005-323991 filed on Nov. 8, 2005, the contents of which are incorporated by this reference.

BACKGROUND OF THE INVENTION

1. Field of the Invention

The present invention relates to a vehicle behavior control device allowing each of a plurality of vehicle behavior controls, such as braking force control or front-rear driving force distribution control, to be performed efficiently and stably in a vehicle with the plurality of vehicle behavior control.

2. Description of the Prior Art

Recently, with regard to vehicles, various vehicle behavior control techniques, including traction control, braking force control and front-rear driving force distribution control, have been proposed and put into practical use. When these various vehicle behavior controls are used in one vehicle, these controls preferably operate without interfering with each other or conflicting with each other.

For example, Japanese Patent Laid-Open No. 2003-191774 discloses an integrated vehicle motion control device in which the software configuration of a device controlling in an integrated manner a plurality of actuators for executing plural kinds of motion controls in a vehicle is hierarchized so as to include: a command unit determining a target vehicle state quantity based on driving related information; and an execution unit receiving the determined target vehicle state quantity as an command from the command unit and executing the received command via at least one of the plurality of actuators. In the integrated vehicle motion control device, the command unit includes: a high command unit configured to determine a first target vehicle state quantity based on the driving related information without considering dynamic behavior of the vehicle; and a low command unit configured to determine a second target vehicle state quantity in view of the dynamic behavior of the vehicle based on the first target vehicle state quantity received from the high command unit.

In the above described integrated vehicle motion control device technique disclosed in Japanese Patent Laid-Open No. 2003-191774, however, when an abnormality occurs due to some reason in the command unit, particularly in the high command unit, it is possible that subsequent commands are not properly executed and no actuator can operate properly, thus deteriorating the basic performance of the vehicle.

In view of the above circumstances, the present invention has been devised, and has an object of providing a vehicle behavior control device which can normally allow a plurality of vehicle behavior controls to operate efficiently and in an integrated manner and even when an abnormality occurs in this integrating control section, allows each of the vehicle behavior controls to operate while maintaining the basic performance.

SUMMARY OF THE INVENTION

The present invention is characterized by a vehicle behavior control device having a plurality of vehicle behavior control means, each said control means configured to control an actuator to control vehicle behavior, including: an operating state detection means configured to detect a parameter associated with an operating state of the actuator controlled by the vehicle behavior control means; a vehicle state detection means configured to detect a parameter associated with a running condition and an operating state of a driver, the parameter required in the control by the vehicle behavior control means; and an adjustment means configured to adjust the plurality of vehicle behavior control means, wherein the adjustment means calculates a control quantity required for the whole vehicle based on the parameter associated with a running condition and an operating state of the driver, calculates an allocated control quantity borne by each said vehicle behavior control means to share the control quantity according to a predetermined ratio, compares the parameter associated with an operating state of the actuator with the allocated control quantity to calculate a correction quantity for each said vehicle behavior control means, and dictate the correction quantity to each said vehicle behavior control means, and wherein each said vehicle behavior control means calculates a target value for controlling the actuator based on the parameter associated with a running condition and an operating state of the driver, and corrects the target value with the correction quantity.

DETAILED DESCRIPTION OF THE PREFERRED EMBODIMENTS

An embodiment of the present invention will be described below with reference to FIGS. 1 to 9.

Figure 1:
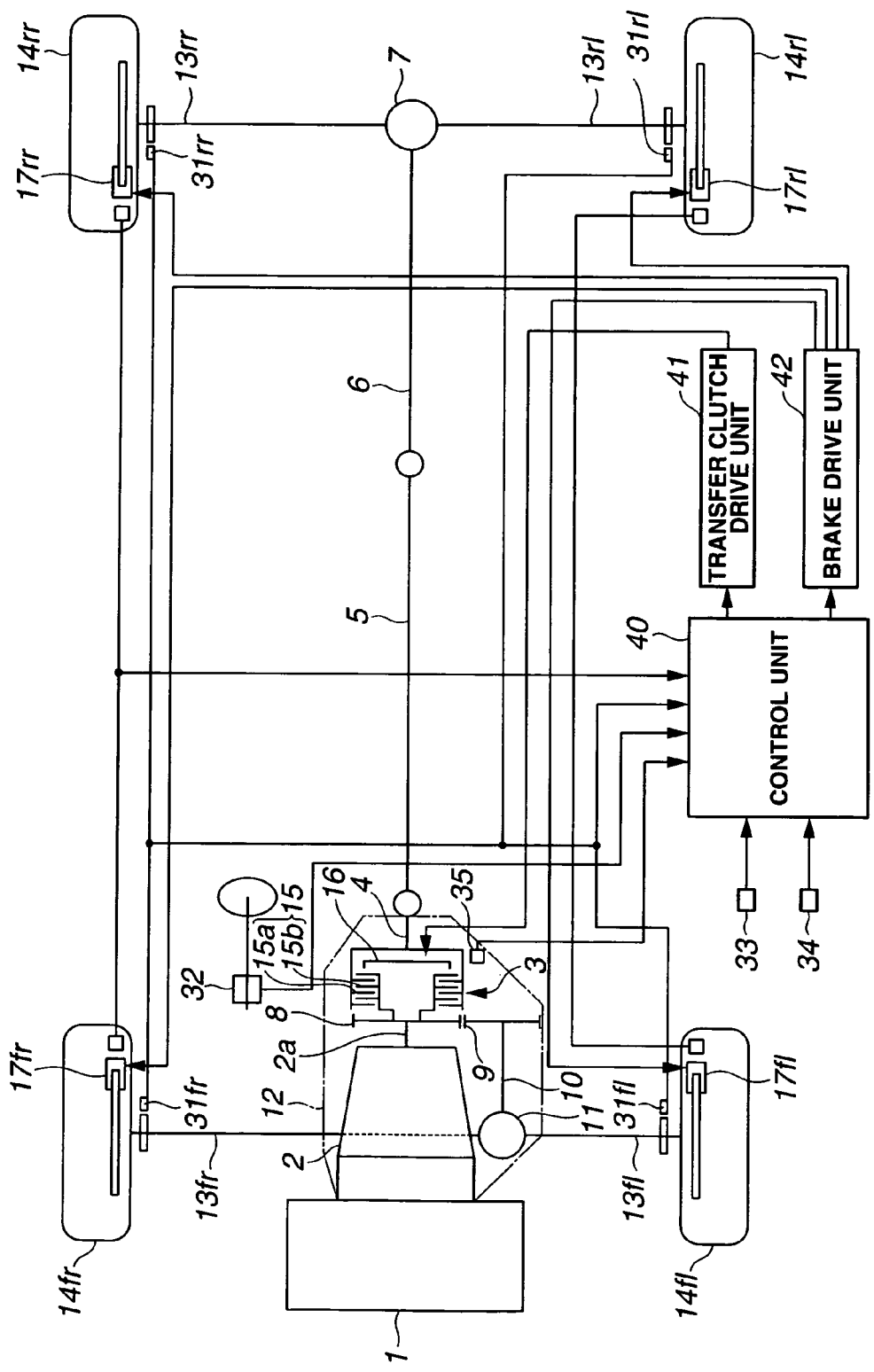
FIG. 1 is an explanatory view illustrating a schematic configuration of the whole vehicle.

Referring to FIG. 1, reference numeral 1 denotes an engine disposed in a front part of a vehicle. Driving force by the engine 1 is transmitted via a transmission output shaft 2a from an automatic transmission 2 (illustrated here having included therein a torque converter) disposed backward of the engine 1 to a transfer 3.

Further, the driving force transmitted to the transfer 3 is inputted to a rear-wheel final reduction gear unit 7 via a rear drive shaft 4, a propeller shaft 5 and a drive pinion shaft portion 6 and at the same time, inputted to a front-wheel final reduction gear unit 11 via a reduction drive gear 8, a reduction driven gear 9 and a front drive shaft 10 being a drive pinion shaft portion. Here, the automatic transmission 2, transfer 3, front-wheel final reduction gear unit 11 and the like are integrally arranged in a casing 12.

Also, the driving force inputted to the rear-wheel final reduction gear unit 7 is transmitted to a left rear wheel 14 rl via a rear-wheel left drive shaft 13 rl and to a right rear wheel 14 rr via a rear-wheel right drive shaft 13 rr. The driving force inputted to the front-wheel final reduction gear unit 11 is transmitted to a left front wheel 14 fl via a front-wheel left drive shaft 13 fl and to a right front wheel 14 fr via a front-wheel right drive shaft 13 fr.

The transfer 3 includes: a wet-type multiple disc clutch (transfer clutch) 15 being a variable torque transmission capacity clutch composed of a drive plate 15a arranged in a reduction drive gear 8 side and a driven plate 15b arranged in a rear drive shaft 4 side alternately overlapped; and a transfer piston 16 variably applying an engaging force (limited slip differential torque) of the transfer clutch 15. Consequently, the vehicle is a four-wheel-drive vehicle based on front-engine front-drive vehicle (FF) which can vary the torque distribution ratio between front wheel and rear wheel in a range, for example from 100:0 to 50:50 by controlling pressing force by the transfer piston 16 to control the limited slip differential torque of the transfer clutch 15.

The pressing force of the transfer piston 16 is generated by a transfer clutch drive unit 41 composed of an oil pressure circuit having a plurality of solenoid valves etc. A control signal (an output signal corresponding to limited slip differential torque with respect to the solenoid valve) for driving the transfer clutch drive unit 41 is outputted from a control unit 40 described later.

Reference numeral 42 denotes a brake drive unit of the vehicle. To the brake drive unit 42, there is connected a master cylinder (not illustrated) connected to a brake pedal manipulated by a driver. When the driver manipulates the brake pedal, a brake pressure is brought by the master cylinder via the brake drive unit 42 into each wheel cylinder (left-front-wheel wheel cylinder 17 fl, right-front-wheel wheel cylinder 17 fr, left-rear-wheel wheel cylinder 17 rl and right-rear-wheel wheel cylinder 17 rr) of four wheels 14 fl, 14 fr, 14 rl and 14 rr, whereby braking is applied to the four wheels to brake the vehicle.

The brake drive unit 42 is a hydrolic unit with a pressurization source, pressure reducing valve, pressure increasing valve and the like, being configured so as to bring a brake pressure independently into each wheel cylinder 17 fl, 17 fr, 17 rl and 17 rr in response to a signal from the control unit 40 described later, other than by the above described brake manipulation by the driver.

In the vehicle, there are provided sensors and other devices for detecting a parameter required for each control unit 40 performing control. More specifically, wheel speeds ω fl, ω fr, ω rl and ω rr of each wheel 14 fl, 14 fr, 14 rl and 14 rr are detected by wheel speed sensors 31 fl, 31 fr, 31 rl and 31 rr, respectively; steering wheel angle θH is detected by a steering wheel angle sensor 32; a yaw rate (yaw angular velocity) (dψ/dt) is detected by a yaw rate sensor 33; an accelerator opening degree θ ACC is detected by an accelerator opening degree sensor 34. These sensors 31 fl, 31 fr, 31 rl, 31 rr, 32, 33 and 34 are each connected to the control unit 40. It is noted that these sensors 31 fl, 31 fr, 31 rl, 31 rr, 32, 33 and 34 are each provided as a vehicle state detection means.

Also, in the vehicle, there are provided a clutch force sensor 35 detecting an actual limited slip differential torque T AWDS actually applied to the transfer piston 16, and brake fluid pressure sensors 36 fl, 36 fr, 36 rl and 36 rr detecting brake fluid pressures P fl, P fr, P rl and P rr actually applied to each wheel cylinder 17 fl, 17 fr, 17 rl and 17 rr. These sensors 35, 36 fl, 36 fr, 36 rl and 36 rr are connected to the control unit 40. It is noted that these sensors 35, 36 fl, 36 fr, 36 rl and 36 rr are each provided as an operating state detection means.

Figure 2:
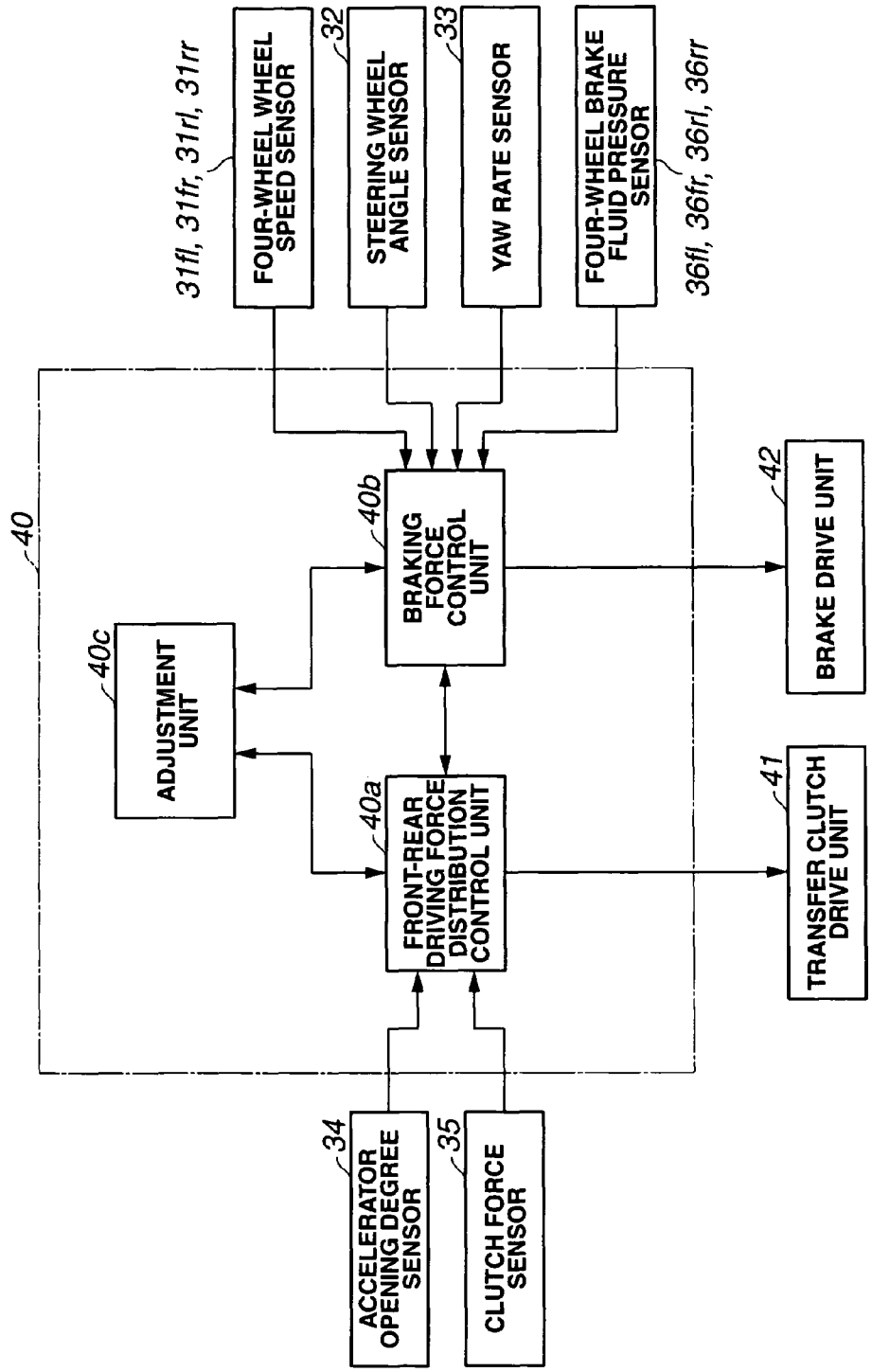
FIG. 2 is a function block diagram of a control unit.

The control unit 40, as illustrated in FIG. 2, mainly includes a front-rear driving force distribution control unit 40a, a braking force control unit 40b and an adjustment unit 40c. The units are each connected so as to be capable of reading required data.

Figure 3:
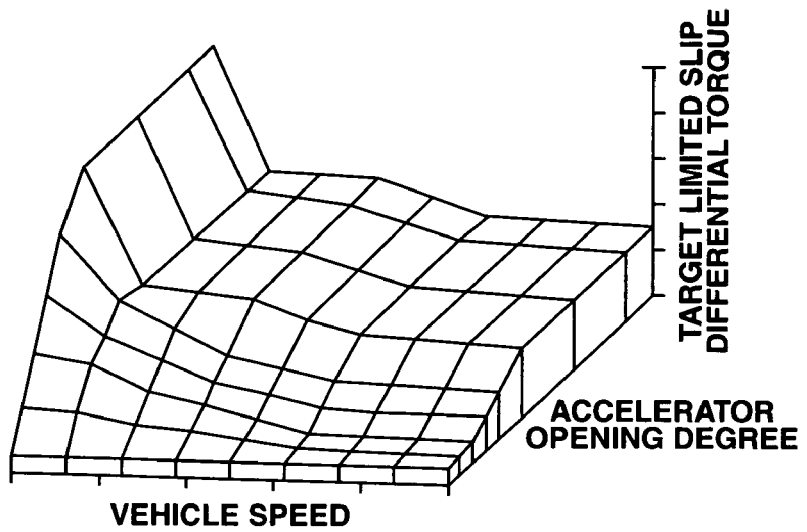
FIG. 3 is an explanatory view of a map of target limited slip differential torque depending on vehicle speed and accelerator opening degree.

The front-rear driving force distribution control unit 40a is connected to the accelerator opening degree sensor 34 and clutch force sensor 35, and as illustrated in FIG. 3, basically sets a target limited slip differential torque T AWDT based on a preliminarily set map of target limited slip differential torque corresponding to vehicle speed V (read from the braking force control unit 40b) and accelerator opening degree θ ACC.

A control correction value ΔT AWD for target limited slip differential torque T AWDT is read from the adjustment unit 40c to correct the target limited slip differential torque T AWDT (T AWDT=T AWDT+ΔT AWD); the corrected value is outputted to the transfer clutch drive unit 41.

The actual limited slip differential torque T AWDS detected by the clutch force sensor 35 is outputted to the adjustment unit 40c. The front-rear driving force distribution control executed by the front-rear driving force distribution control unit 40a will be described in detail with reference to a flowchart of FIG. 8.

The braking force control unit 40b is connected to the four-wheel wheel speed sensors 31 fl, 31 fr, 31 rl and 31 rr, the steering wheel angle sensor 32, the yaw rate sensor 33 and the four-wheel brake fluid pressure sensors 36 fl, 36 fr, 36 rl and 36 rr.

Based on a vehicle speed V (for example, an average of four-wheel wheel speeds) and steering wheel angle θH, a target yaw rate (dψ/dt)t is calculated. For example, this target yaw rate (dψ/dt)t is calculated as follows.

Figure 4:
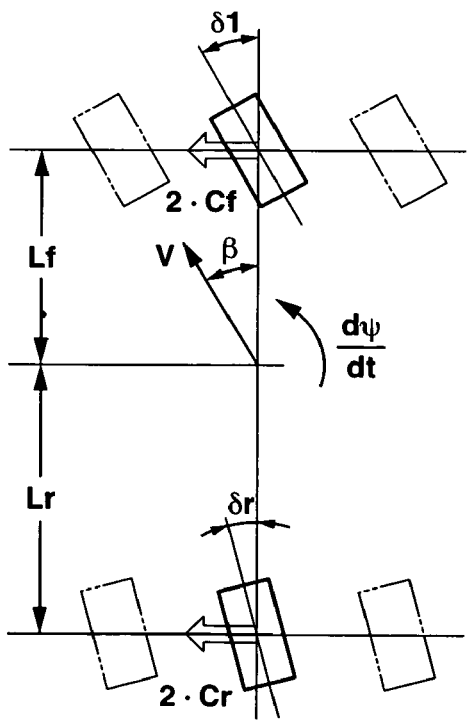
FIG. 4 is an explanatory view illustrating a two-wheel model of vehicle lateral motion.

First, using a vehicle motion model of FIG. 4, a motion equation of vehicle lateral motion is set up. When the cornering forces (one wheel) of front and rear wheels, the vehicle mass and the lateral acceleration are $C_f$, $C_r$, M and $(d^2y/dt^2)$, respectively, then the motion equation with respect to translational motion in the lateral direction of the vehicle is $$2 \cdot Cf + 2 \cdot Cr = M \cdot (d^2y/dt^2) \tag{1}$$

Meanwhile, the motion equation of relating motion around center of gravity is expressed as the following formula (2) when the distances from center of gravity to front wheel axle and rear wheel axle, the yawing inertia moment, the yaw angular acceleration are L f, L r, I z and $(d^2\psi/dt^2)$, respectively.

$$2 \cdot Cf \cdot Lf - 2 \cdot Cr \cdot Lr = Iz \cdot (d^2\varphi/dt^2) \tag{2}$$

Also, when the vehicle body skid angle and vehicle body skid angular velocity are β and (dβ/dt), respectively, then the lateral acceleration $(d^2y/dt^2)$ is expressed as the following formula.

$$(d^2y/dt^2) = V \cdot ((d\beta/dt) + (d\varphi/dt)) \tag{3}$$

Thus the above formula (1) is expressed as the following formula (4).

$$2 \cdot Cf + 2 \cdot Cr = M \cdot V \cdot ((d\beta/dt) + (d\varphi/dt)) \tag{4}$$

The cornering force has a response close to first-order delay with respect to tire slip angle. However, when this response delay is neglected and further, linearization is performed using equivalent cornering power having suspension characteristics incorporated into tire characteristics, then the cornering force is expressed as the following formula.

$$Cf = Kf \cdot \alpha f \tag{5}$$

$$Cr = Kr \cdot \alpha r \tag{6}$$

where Kf and Kr are equivalent cornering powers of front and rear wheels, and αf and αr are slip angles of front and rear wheels.

When effects of roll and suspension in the equivalent cornering powers Kf and Kr are considered and these equivalent cornering powers Kf and Kr are used, the slip angles αf and αr of front and rear wheels can be simplified as follows. Here, δf and δr are the steering angles of front and rear wheels, and n is the steering gear ratio.

$$\alpha f = \delta f - (\beta + Lf \cdot (d\phi/dt)/V)$$

$$= (\theta H/n) - (\beta + Lf \cdot (d\phi/dt)/V) \quad (7)$$

$$\alpha r = \delta r - (\beta - Lr \cdot (d\phi/dt)/V) \quad (8)$$

When the above motion equations are brought together, the following state equation is obtained.

$$(dx(t)/dt) = A \cdot x(t) + B \cdot u(t) \quad (9)$$
$$x(t) = [\beta \quad (d\phi/dt)]^T$$
$$u(t) = [\theta H \quad \delta r]^T$$

$$A = \begin{bmatrix} a11 & a12 \\ a21 & a22 \end{bmatrix} \quad \text{[Formula 1]}$$

$$B = \begin{bmatrix} b11 & b12 \\ b21 & b22 \end{bmatrix}$$

$$a11 = -2 \cdot (Kf + Kr)/(M \cdot V)$$
$$a12 = -1.0 - 2 \cdot (Lf \cdot Kf - Lr \cdot Kr)/(M \cdot V^2)$$
$$a21 = -2 \cdot (Lf \cdot Kf - Lr \cdot Kr)/Iz$$
$$a22 = -2 \cdot (Lf^2 \cdot Kf + Lr^2 \cdot Kr)/(Iz \cdot V)$$
$$b11 = 2 \cdot Kf/(M \cdot V \cdot n)$$
$$b12 = 2 \cdot Kr/(M \cdot V)$$
$$b21 = 2 \cdot Lf \cdot Kf/Iz$$
$$b22 = -2 \cdot Lr \cdot Kr/Iz$$

Thus, by integrating the yaw angular acceleration ($d^2\psi/dt^2$) calculated by use of the above formula (9), the target yaw rate $(d\psi/dt)t$ is calculated.

Using the calculated target yaw rate $(d\psi/dt)t$ and a value $(d\psi/dt)$ obtained from the yaw rate sensor 33, a yaw rate deviation $\Delta(d\psi/dt)$ is calculated by use of the following formula (10).

$$\Delta(d\psi/dt) = (d\psi/dt) - (d\psi/dt)t \quad (10)$$

Based on this yaw rate deviation $\Delta(d\psi/dt)$, a target yaw moment M VDCT is calculated, for example by the following formula (11).

$$M\ VDCT = G\ VDC \cdot \Delta(d\psi/dt) \quad (11)$$

where G VDC is the control gain.

Then, a control correction value ΔM VDC for target yaw moment M VDCT is read from the adjustment unit 40c to correct the target yaw moment M VDCT (M VDCT=M VDCT+ΔM VDC); based on the yaw rate $(d\psi/dt)$ obtained from the yaw rate sensor 33 and the target yaw moment M VDCT, a wheel to be braked is selected.

More specifically, assuming that ε and εM are each a positive number substantially close to "0" preliminarily determined by experiments, calculations or the like, (Case 1) When $(d\psi/dt) > \epsilon$ and M VDCT>εM (a left turning and under steer state), the left rear wheel is braked.
(Case 2) When $(d\psi/dt) > \epsilon$ and M VDCT>−εM (a left turning and over steer state), the right front wheel is braked.
(Case 3) When $(d\psi/dt) < \epsilon$ and M VDCT>εM (a right turning and over steer state), the left front wheel is braked.
(Case 4) When $(d\psi/dt) < \epsilon$ and M VDCT<−εM (a right turning and under steer state), the right rear wheel is braked.
(Case 5) When $|(d\psi/dt)| \leq \epsilon$ (a substantially straight-ahead state) or |M VDCT|≦εM (a turning state), selection of wheel to be braked is not performed and no braking is performed.

A breaking force F applied to the selected wheel is calculated, for example by the following formula (12).

$$F = M\ VDCT/(d/2) \quad (12)$$

where d is the tread.

Thus, brake fluid pressures P fl, P fr, P rl and P rr applied to wheels to be braked are set for each wheel, for example by any of the following formulae (13) to (16).

$$P\ fl = k\ fl \cdot F \quad (13)$$

$$P\ fr = k\ fr \cdot F \quad (14)$$

$$P\ rl = k\ rl \cdot F \quad (15)$$

$$P\ rr = k\ rr \cdot F \quad (16)$$

where k fl, k fr, k rl and k rr are conversion coefficients.

The brake fluid pressure thus set is outputted to the brake drive unit 42.

Also, brake fluid pressures P fl, P fr, P rl, and P rr detected by the four-wheel brake fluid pressure sensors 36 fl, 36 fr, 36 rl, and 36 rr are converted into breaking forces F fl, F fr, F rl, and F rr of each wheel by the above relational expression, and outputted to the adjustment unit 40c.

That is, $$F\ fl = P\ fl/k\ fl \quad (17)$$

$$F\ fr = P\ fr/k\ fr \quad (18)$$

$$F\ rl = P\ rl/k\ rl \quad (19)$$

$$F\ rr = P\ rr/k\ rr \quad (20)$$

Figure 9:
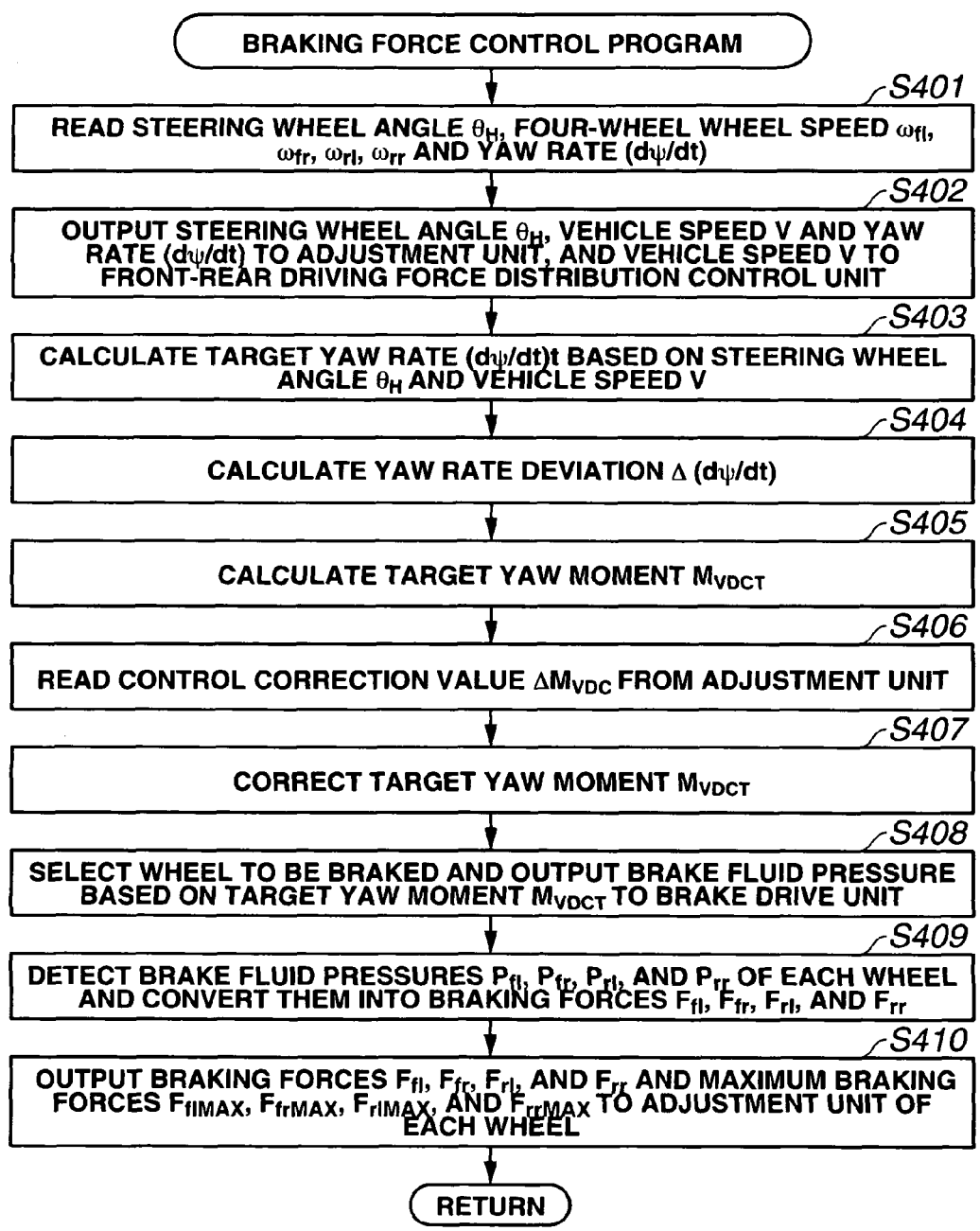
FIG. 9 is a flowchart of a braking force control program.

The braking force control executed by the braking force control unit 40b will be described in detail with reference to a flowchart of FIG. 9.

The adjustment unit 40c identifies a vehicle behavior control (front-rear driving force distribution control and braking force control in the present embodiment) with which the control unit 40 is provided and based on a vehicle running condition and driving condition (vehicle speed V, steering wheel angle θH and yaw rate $(d\psi/dt)$ in the present embodiment), further calculates a control quantity (for example, yaw moment deviation ΔMz) required for the whole vehicle.

More specifically, a target yaw moment M zt is calculated by multiplying the yaw angular acceleration ($d^2\psi/dt^2$) calculated by use of the above formula (9) by a yawing inertia moment $I_z$; an actual yaw moment Mzs is calculated by multiplying a value obtained by differentiating a yaw rate $(d\psi/dt)$ obtained by the yaw rate sensor 33 by the yawing inertia moment $I_z$; a deviation between these values (yaw moment deviation ΔMz=Mzs−Mzt) is set as the control quantity required for the whole vehicle.

Figure 5:
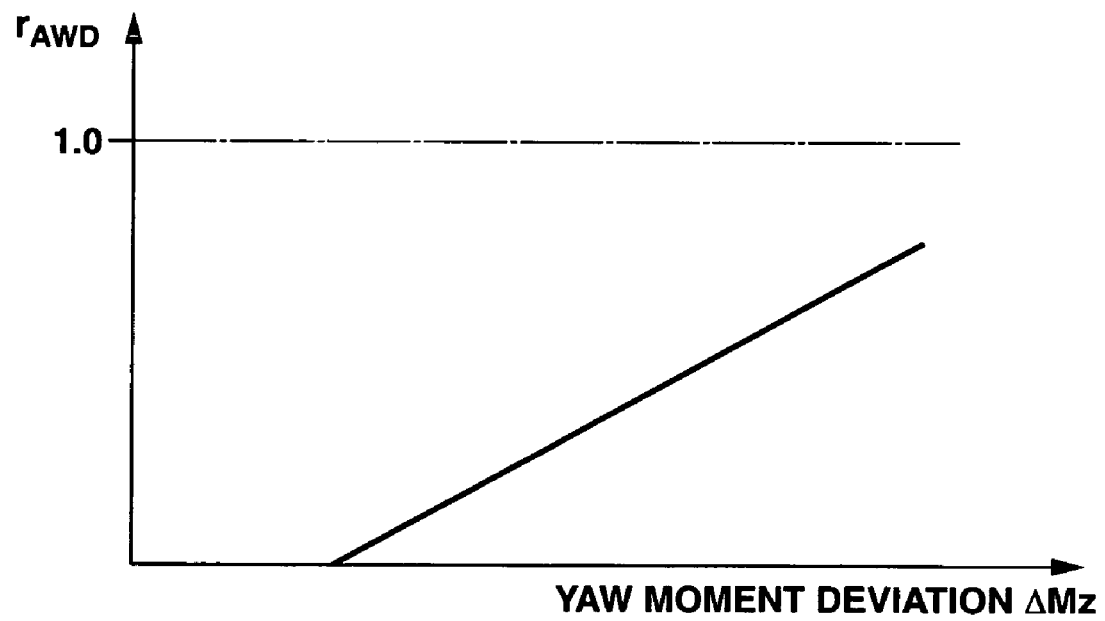
FIG. 5 is an explanatory view illustrating an example of ratio between front-rear driving force distribution control and braking force control.

Then, a ratio r AWD between the front-rear driving force distribution control and braking force control, which is optimum for determining the yaw moment deviation ΔMz, is set by consulting, for example, a map as illustrated in FIG. 5, preliminarily set by experiments, calculations or the like. Based on this ratio, target yaw moments M AWD and M VDC borne by each control are set by use of the following formulae (21) and (22).

$$M\ AWD = r\ AWD \cdot \Delta Mz \quad (21)$$

$$M\ VDC = (1 - r\ AWD) \cdot \Delta Mz \quad (22)$$

By comparing the target yaw moments M AWD and M VDC thus obtained with the operating state of each control, control correction values ΔT AWD and ΔM VDC for each control are calculated, and outputted to the control units 40a and 40b, respectively.

The calculation of a control correction value ΔT AWD will now be described. First, a vehicle behavior gain G AWD with respect to yaw moment in limited slip differential torque is read from the front-rear driving force distribution control unit 40a, and the target yaw moment M AWD calculated by use of the above formula (21) is converted into a limited slip differential torque T AWD by the following formula (23).

$$T\ AWD = G\ AWD \cdot M\ AWD \quad (23)$$

Then, using the following formula (24), there is calculated a deviation between this limited slip differential torque T AWD and an actual operating state of front-rear driving force distribution control outputted from the front-rear driving force distribution control unit 40a, namely the actual operating state being an actual limited slip differential torque T AWDS detected by the clutch force sensor 35. This value is set as the control correction value ΔT AWD.

$$\Delta T\ AWD = T\ AWDS - T\ AWD \quad (24)$$

This control correction value ΔT AWD is limited by a maximum limited slip differential torque T AWDMAX outputted along with the actual limited slip differential torque T AWDS from the front-rear driving force distribution control unit 40a and outputted to the adjustment unit 40c.

The calculation of a control correction value ΔM VDC will now be described. A maximum value F MAX of the actual operating state of the braking force control, i.e., four-wheel breaking forces F fl, F fr, F rl, and F rr outputted from the braking force control unit 40b is converted into a yaw moment value M MAX by the following formula (25).

$$M\ MAX = F\ MAX \cdot (d/2) \quad (25)$$

Then, a deviation between the yaw moment M MAX and the target yaw moment M VDC calculated by use of the above formula (22) is calculated by use of the following formula (26) and set as the control correction value ΔM VDC.

$$\Delta M\ VDC = M\ MAX - M\ VDC \quad (26)$$

This control correction value ΔM VDC is limited by maximum breaking forces F flMAX, F frMAX, F rlMAX and F rrMAX of each breaking force F fl, F fr, F rl and F rr outputted along with the four-wheel breaking forces Ffl, F fr, Frl and Frr from the braking force control unit 40b and outputted to the adjustment unit 40c.

Figure 6:
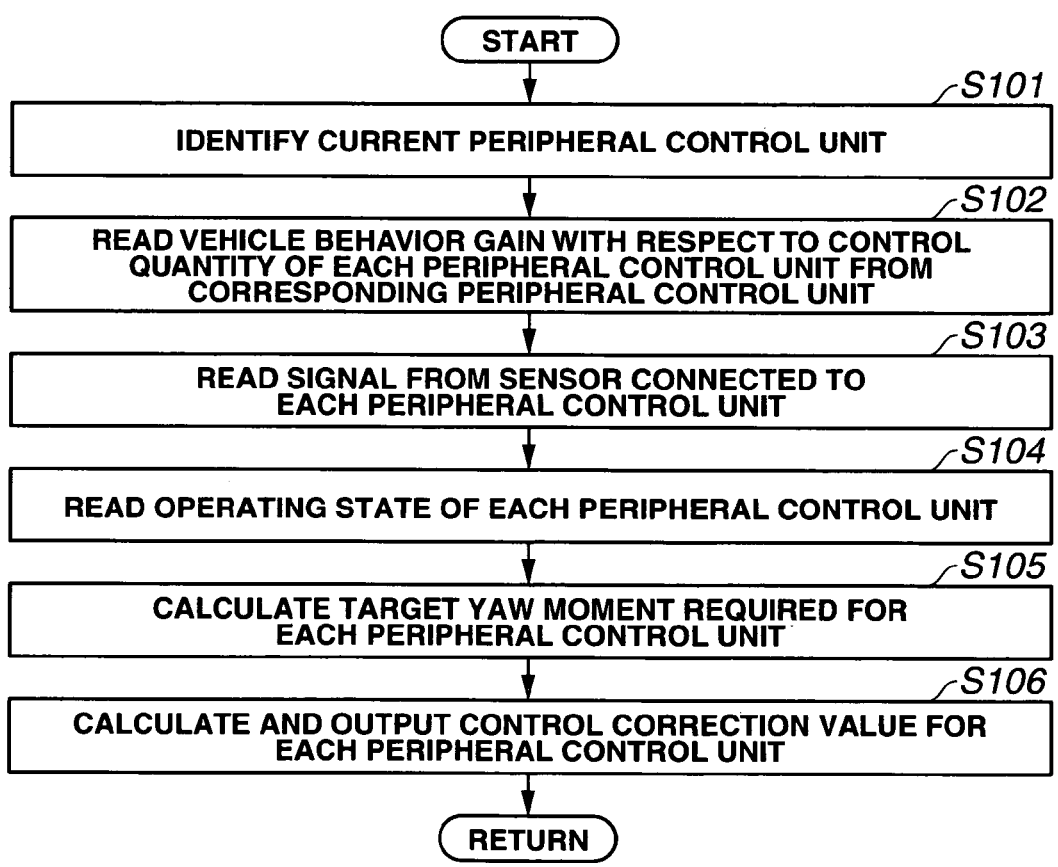
FIG. 6 is a flowchart of a vehicle behavior control adjustment program.
Figure 7:
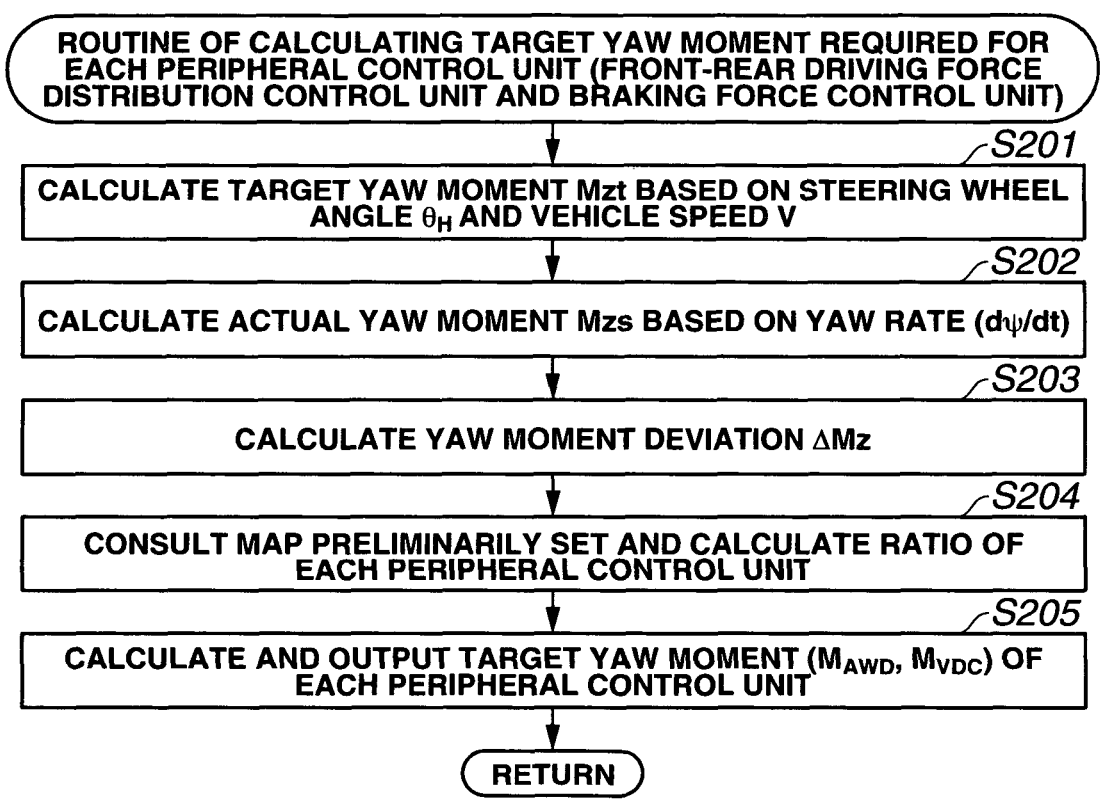
FIG. 7 is a flowchart of a routine of calculating a target yaw moment required for each peripheral control unit.

The braking force control executed by this adjustment unit 40c will be described in detail with reference to flowcharts of FIGS. 6 and 7.

As described above, according to the present embodiment, the front-rear driving force distribution control unit 40a and braking force control unit 40b are provided as the vehicle behavior control means; the adjustment unit 40c is provided as the adjustment means.

The operation executed by the control unit 40 will now be described with reference to flowcharts in FIGS. 6 to 9. First, a vehicle behavior control adjustment program executed by the adjustment unit 40c will be described with reference to a flowchart of FIG. 6.

First, in step (hereinafter, "S" for short) 101, a current peripheral control unit is identified. In the present embodiment, the front-rear driving force distribution control unit 40a and braking force control unit 40b are identified.

Subsequently, the flow proceeds to S102, in which vehicle behavior gains with respect to control quantity in each peripheral control unit are read from corresponding peripheral control units. According to the present embodiment, a vehicle behavior gain G AWD with respect to yaw moment in limited slip differential torque is read from the front-rear driving force distribution control unit 40a.

Subsequently, the flow proceeds to S103, in which signals from sensors connected to each peripheral control unit are read. According to the present embodiment, a vehicle speed V, steering wheel angle θH and yaw rate (dψ/dt) are read.

Subsequently, the flow proceeds to S104, in which an operating state of each peripheral control unit is read. According to the present embodiment, an actual limited slip differential torque T AWDS is read from the front-rear driving force distribution control unit 40a; breaking forces F fl, F fr, F rl and F rr of each wheel are read from the braking force control unit 40b.

Subsequently, the flow proceeds to S105, in which a target yaw moment required for each peripheral control unit is calculated. According to the present embodiment, a target yaw moment M AWD required for the front-rear driving force distribution control unit 40a and a target yaw moment M VDC required for the braking force control unit 40b are calculated. The specific operation executed in S105 will be described with reference to a flowchart of FIG. 7.

Subsequently, the flow proceeds to S106, in which a control correction value for each peripheral control unit is calculated and outputted, and then the program is completed. According to the present embodiment, for the front-rear driving force distribution control unit 40a, a limited slip differential torque T AWD is calculated by use of the above formula (23) and a control correction value ΔT AWD is calculated by use of formula (24); the limited slip differential torque and control correction value are limited by a maximum limited slip differential torque T AWDMAX and outputted to the front-rear driving force distribution control unit 40a.

Also, for braking force control unit 40b, a yaw moment value M MAX is calculated by use of the above formula (25) and a control correction value ΔM VDC is calculated by use of formula (26); the yaw moment value and control correction value are limited by maximum breaking forces F flMAX, F frMAX, F rlMAX and F rrMAX of corresponding wheels to be braked, and outputted to the braking force control unit 40b.

The processing in S105 of calculating a target yaw moment required for each peripheral control unit (front-rear driving force distribution control unit 40a and braking force control unit 40b) will now be described with reference to a flowchart of FIG. 7.

First, in S201, a target yaw moment Mzt is calculated based on steering wheel angle θH and vehicle speed V. More specifically, the yaw angular acceleration ($d^2\psi/dt^2$) calculated by use of the above formula (9) is multiplied by a yawing inertia moment I z to calculate a target yaw moment Mzt.

Subsequently, the flow proceeds to S202, in which an actual yaw moment Mzs is calculated based on a yaw rate (dψ/dt) obtained from the yaw rate sensor 33. More specifically, a value obtained by differentiating a yaw rate (dψ/dt) obtained from the yaw rate sensor 33 is multiplied by the yawing inertia moment Iz to calculate an actual yaw moment Mzs.

Subsequently, the flow proceeds to S203, in which a deviation between the target yaw moment Mzt and actual yaw moment Mzs is calculated to determine a yaw moment deviation ΔMz.

Subsequently, the flow proceeds to S204, in which a map (for example, one as illustrated in FIG. 5) preliminarily set is consulted to calculate a ratio r AWD between the front-rear driving force distribution control and braking force control, which is optimum for determining the yaw moment deviation ΔMz.

Subsequently, the flow proceeds to S205, in which target yaw moments M AWD and M VDC of the front-rear driving force distribution control unit 40a and braking force control unit 40b are calculated by use of the above formulae (21) and (22) and outputted to be used in subsequent processings, and then the routine is completed.

Figure 8:
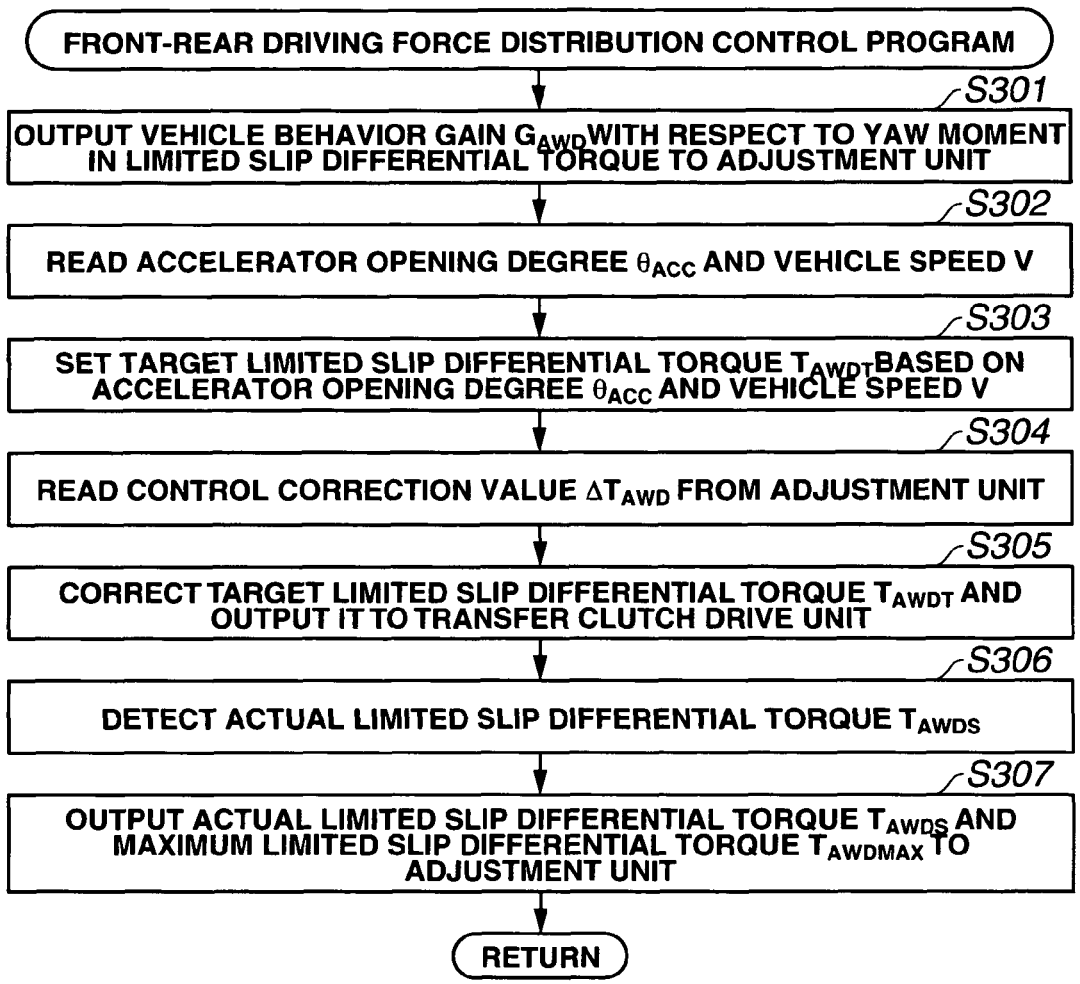
FIG. 8 is a flowchart of a front-rear driving force distribution control program.

The front-rear driving force distribution control executed by the front-rear driving force distribution control unit 40a will now be described with reference to a flowchart of FIG. 8. First, in S301, a vehicle behavior gain G AWD with respect to yaw moment in limited slip differential torque is outputted to the adjustment unit 40c.

Subsequently, the flow proceeds to S302, in which an accelerator opening degree θ ACC and a vehicle speed V are read from the accelerator opening degree sensor 34 and braking force control unit 40b, respectively.

Subsequently, the flow proceeds to S303, in which a target limited slip differential torque T AWDT is set based on the preliminarily set map (illustrated in FIG. 3) of target limited slip differential torque corresponding to vehicle speed V and accelerator opening degree θ ACC.

Subsequently, the flow proceeds to S304, in which a control correction value ΔT AWD is read from the adjustment unit 40c.

Subsequently, the flow proceeds to S305, in which the target limited slip differential torque T AWDT set in S303 is corrected by the control correction value ΔT AWD (T AWDT=T AWDT+ΔT AWD), and this corrected value is outputted to the transfer clutch drive unit 41.

Subsequently, the flow proceeds to S306, in which an actual limited slip differential torque T AWDS is detected by the clutch force sensor 35, and then flow proceeds to S307, in which the actual limited slip differential torque T AWDS and maximum limited slip differential torque T AWDMAX are outputted to the adjustment unit 40c, and then the program is completed.

The braking force control executed by the braking force control unit 40b will now be described with reference to a flowchart of FIG. 9. First, in S401, a steering wheel angle θH is read from the steering wheel angle sensor 32; wheel speeds ω fl, ω fr, ω rl and ω rr of each wheel are read from the wheel speed sensors 31 fl, 31 fr, 31 rl and 31 rr; a yaw rate (dψ/dt) is read from the yaw rate sensor 33.

Subsequently, the flow proceeds to S402, in which the steering wheel angle θH, the vehicle speed V (for example, an average of wheel speeds ω fl, ω fr, ω rl and ω rr) and the yaw rate (dψ/dt) are outputted to the adjustment unit 40c; the vehicle speed V is outputted to the front-rear driving force distribution control unit 40a.

Subsequently, the flow proceeds to S403, in which based on the vehicle speed V and steering wheel angle θH, a target yaw rate (dψ/dt) t is calculated by use of integrating the yaw angular acceleration $(d^2\psi/dt^2)$ obtained from formula (9).

Subsequently, the flow proceeds to S404, in which a yaw rate deviation Δ(dψ/dt) is calculated by use of the above formula (10).

Subsequently, the flow proceeds to S405, in which a target yaw moment M VDCT is calculated, for example by the above formula (11).

Subsequently, the flow proceeds to S406, in which a control correction value ΔM VDC is read from the adjustment unit 40c.

Subsequently, the flow proceeds to S407, in which the target yaw moment M VDCT calculated in S405 is corrected (M VDCT=M VDCT+ΔM VDC).

Subsequently, the flow proceeds to S408, in which based on the yaw rate (dψ/dt) obtained from the yaw rate sensor 33 and the target yaw moment M VDCT, a wheel to be braked is selected depending on the above described (Case 1) to (Case 5), and based on the above formula (12) and formulae (13) to (16), a brake fluid pressure to be applied to the wheel to be braked is calculated and outputted to the brake drive unit 42.

Subsequently, the flow proceeds to S409, in which brake fluid pressures P fl, P fr, P rl and P rr are detected by the four-wheel brake fluid pressure sensors 36 fl, 36 fr, 36 rl and 36 rr and converted into breaking forces F fl, F fr, F rl, and F rr of each wheel by the above formulae (17) to (20).

Then, the breaking forces F fl, F fr, F rl, and F rr and the maximum breaking forces F flMAX, F frMAX, F rlMAX and F rrMAX of each wheel are outputted to the adjustment unit 40c, and then the program is completed.

As such, according to the present embodiment, neither of the peripheral controls (front-rear driving force distribution control unit 40a and braking force control unit 40b) is integrated into the adjustment unit 40c; the adjustment unit 40c operates so as to adjust each peripheral control. Accordingly, the adjustment unit 40c usually allows the plurality of vehicle behavior controls to operate efficiently and in an integrated manner. Even when an abnormality occurs in the adjustment unit 40c, each peripheral control unit (front-rear driving force distribution control unit 40a and braking force control unit 40b) operates while maintaining the basic performance, so satisfactory control can be performed when a trouble occurs.

In the present embodiment, the peripheral control is described by taking as an example, front-rear driving force distribution control and braking force control, but not limited thereto. It will easily be appreciated that the present invention can also be similarly applied to a combination including another control such as left-right driving force distribution control. Also, the number of peripheral controls is not limited to two, but may be three or more.

Also, the approach of front-rear driving force distribution control and braking force control shown in the present embodiment is merely exemplary. Front-rear driving force distribution control and braking force control based on another approach may be used.

Also, according to the present embodiment, a ratio between each peripheral control is determined by use of a map. However, it may be determined by calculation.

Also, part borne by each peripheral control is determined by yaw moment ratio. However, the part may be borne by additionally considering vehicle longitudinal force and lateral force.

Also, the ratio of borne part between each peripheral control may be varied by additionally considering factors of road surface conditions (road surface friction coefficient), road surface configuration (detected by a camera, navigation system or the like) and the presence/absence of forward obstacles (detected by a camera, laser radar or the like).

As described above, according to the vehicle behavior control device of the present invention, a plurality of vehicle behavior controls can usually be operated efficiently and in an integrated manner, and even when an abnormal state occurs in the control section performing this integration, each vehicle behavior control can operate while maintaining the basic performance.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle behavior control device, comprising:
    a plurality of vehicle behavior control means, each said control means configured to control an actuator to control vehicle behavior;
    an operating state detection means configured to detect a parameter associated with an operating state of the actuator controlled by the vehicle behavior control means;
    a vehicle state detection means configured to detect a parameter associated with a running condition and an operating state of a driver, the parameter required in the control by the vehicle behavior control means; and
    an adjustment means configured to adjust the plurality of vehicle behavior control means,
    wherein the adjustment means calculates a control quantity required for the whole vehicle based on the parameter associated with a running condition and an operating state of the driver, calculates an allocated control quantity borne by each said vehicle behavior control means to share the control quantity according to a predetermined ratio, compares the parameter associated with an operating state of the actuator with the allocated control quantity to calculate a correction quantity for each said vehicle behavior control means, and dictate the correction quantity to each said vehicle behavior control means, and
    wherein each said vehicle behavior control means calculates a target value for controlling the actuator based on the parameter associated with a running condition and an operating state of the driver, and corrects the target value with the correction quantity.

2. The vehicle behavior control device according to claim 1, wherein the plurality of vehicle behavior control means have a front-rear driving force distribution control means configured to control a transfer clutch for varying torque distribution between a front wheel and a rear wheel, and a braking force control means configured to independently control a braking force of each wheel,
    wherein the operating state detection means has a clutch force sensor for detecting a limited slip differential torque on the transfer clutch, and a brake fluid pressure sensor for detecting a braking force of each said wheel, and
    wherein the adjustment means takes a deviation between a target yaw moment calculated based on the parameter associated with a running condition and an operating state of the driver and an actual yaw moment as the control quantity, calculates, according to a predetermined ratio, a first allocated control quantity borne by the front-rear driving force distribution control means to share the control quantity and a second allocated control quantity borne by the braking force control means to share the control quantity, compares the first allocated control quantity with the limited slip differential torque to calculate a correction quantity for the front-rear driving force distribution control means, and on the other hand compares the second allocated control quantity with the braking force to calculate a correction quantity for the braking force control means.

3. The vehicle behavior control device according to claim 1, wherein each said correction quantity is set at or below a limit value set for each said vehicle behavior control means.

4. The vehicle behavior control device according to claim 2, wherein the first allocated control quantity is set at or below a first limit value set by the front-rear driving force distribution control means and the second allocated control quantity is set at or below a second limit value set by the braking force control means.

5. The vehicle behavior control device according to claim 2, wherein the predetermined ratio is set based on a deviation between the target yaw moment and the actual yaw moment.

6. The vehicle behavior control device according to claim 4, wherein the predetermined ratio is set based on a deviation between the target yaw moment and the actual yaw moment.

7. A vehicle behavior control device, comprising:
    a plurality of vehicle behavior control units that control actuators used to control vehicle behavior;
    operating state detectors which detect parameters associated with an operating state of the actuators controlled by the vehicle behavior control units;
    vehicle state detectors which detect parameters associated with a running condition and an operating state of a driver, the parameters required in the control by the vehicle behavior control units; and
    an adjustment unit configured to adjust the plurality of vehicle behavior control units,
    wherein the adjustment unit calculates a control quantity required for the whole vehicle based on the parameters associated with a running condition and an operating state of the driver, calculates an allocated control quantity borne by each of said vehicle behavior control units to share the control quantity according to a predetermined ratio, compares the parameters associated with operating states of said actuators with the allocated control quantity to calculate a correction quantity for each of said vehicle behavior control units, and dictates the correction quantity to each of said vehicle behavior control units, and
    wherein each of said vehicle behavior control units calculates a target value for controlling the actuators based on the parameter associated with a running condition and an operating state of the driver, and corrects the target value with the correction quantity.

8. The vehicle behavior control device according to claim 7, wherein the plurality of vehicle behavior control units comprise a front-rear driving force distribution control device configured to control a transfer clutch for varying torque distribution between a front wheel and a rear wheel and a braking force control assembly that is configured to independently control a braking force of each wheel,
    wherein the operating state detectors comprise a clutch force sensor for detecting a limited slip differential torque on the transfer clutch and a brake fluid pressure sensor for detecting a braking force of each said wheel, and
    wherein the adjustment unit takes a deviation between a target yaw moment calculated based on the parameter associated with a running condition and an operating state of the driver and an actual yaw moment as the control quantity, calculates, according to a predetermined ratio, a first allocated control quantity borne by the front-rear driving force distribution control device to share the control quantity and a second allocated control quantity borne by the braking force control assembly to share the control quantity, compares the first allocated control quantity with the limited slip differential torque to calculate a correction quantity for the front-rear driving force distribution control device, and on the other hand, compares the second allocated control quantity with the braking force to calculate a correction quantity for the braking force control assembly.

9. The vehicle behavior control device according to claim 8, wherein each said correction quantity is set at or below a limit value set relative to said vehicle behavior control units.

10. The vehicle behavior control device according to claim 8, wherein the first allocated control quantity is set at or below a first limit value set by the front-rear driving force distribution control device and the second allocated control quantity is set at or below a second limit value set by the braking force control assembly.

11. The vehicle behavior control device according to claim 8, wherein the predetermined ratio is set based on a deviation between the target yaw moment and the actual yaw moment.

12. The vehicle behavior control device according to claim 10, wherein the predetermined ratio is set based on a deviation between the target yaw moment and the actual yaw moment.

* * * * *